(12) United States Patent
Zlopaša et al.

(10) Patent No.: US 12,384,457 B2
(45) Date of Patent: Aug. 12, 2025

(54) STEERING SYSTEM FOR AUTONOMOUS MOBILE ROBOT

(71) Applicant: Gideon Brothers d.o.o., Osijek (HR)

(72) Inventors: Hinko Zlopaša, Daruvar (HR); Dean Deković, Poreč (HR); Krešimir Zidanić, Zagreb (HR); Edin Kočo, Zagreb (HR)

(73) Assignee: Gideon Brothers d.o.o., Osijek (HR)

( * ) Notice: Subject to any disclaimer, the term of this patent is extended or adjusted under 35 U.S.C. 154(b) by 847 days.

(21) Appl. No.: 17/576,036

(22) Filed: Jan. 14, 2022

(65) Prior Publication Data
US 2023/0131736 A1    Apr. 27, 2023

Related U.S. Application Data

(60) Provisional application No. 63/270,787, filed on Oct. 22, 2021.

(51) Int. Cl.
*B62D 7/14* (2006.01)
*B62D 5/04* (2006.01)

(52) U.S. Cl.
CPC ............. *B62D 7/14* (2013.01); *B62D 5/0421* (2013.01); *B62D 7/142* (2013.01)

(58) Field of Classification Search
CPC .................................. B62D 7/14; B62D 7/142
See application file for complete search history.

(56) References Cited

U.S. PATENT DOCUMENTS

| | | | |
|---|---|---|---|
| 6,619,680 B2 * | 9/2003 | Platteeuw | B62D 13/04 |
| | | | 280/100 |
| 7,383,916 B2 * | 6/2008 | Genz | B62D 7/142 |
| | | | 180/408 |
| 9,471,062 B1 | 10/2016 | Theobald | |
| 9,606,544 B2 | 3/2017 | Gariepy et al. | |
| 9,688,288 B1 | 6/2017 | Lathrop et al. | |
| 9,804,594 B2 | 10/2017 | Gariepy et al. | |

(Continued)

FOREIGN PATENT DOCUMENTS

| CN | 201633774 U | * 11/2010 |
|---|---|---|
| CN | 104401395 A | * 3/2015 |

(Continued)

OTHER PUBLICATIONS

PCT International Search Report and Written Opinion, PCT Application No. PCT/IB2021/059263, Jan. 31, 2022, 15 pages.

(Continued)

*Primary Examiner* — Kevin Hurley
(74) *Attorney, Agent, or Firm* — Fenwick & West LLP

(57) ABSTRACT

An autonomous mobile robot may use an improved steering system. The improved steering system may include a steering motor that is operably coupled to a motor shaft. The motor shaft may be aligned at an offset position relative to a center axis of the autonomous mobile robot. The motor shaft may be operably coupled to a front and rear steering linkage. Each steering linkage may include a pitman arm that is coupled to the motor shaft and a drag link. The drag link may be coupled to a first steering arm and a tie rod. The tie rod may also be coupled to a second steering arm. The first steering arm may be coupled to a first wheel and the second steering arm may be coupled to a second wheel.

15 Claims, 10 Drawing Sheets

(56) References Cited

U.S. PATENT DOCUMENTS

| | | |
|---|---|---|
| 9,886,035 B1 | 2/2018 | Watts et al. |
| 9,891,630 B2 | 2/2018 | Gariepy et al. |
| 9,963,155 B2 | 5/2018 | Gariepy et al. |
| 10,102,429 B2 | 10/2018 | Schnittman |
| 10,120,390 B2 | 11/2018 | Gariepy et al. |
| 10,191,494 B2 | 1/2019 | Gariepy et al. |
| 10,241,515 B2 | 3/2019 | Gariepy et al. |
| 10,386,851 B2 | 8/2019 | Moore et al. |
| 10,429,847 B2 | 10/2019 | Moore et al. |
| 10,462,076 B2 | 10/2019 | Gariepy et al. |
| 10,809,734 B2 | 10/2020 | De Castro |
| 2009/0326713 A1 | 12/2009 | Moriya |
| 2012/0152877 A1 | 6/2012 | Tadayon |
| 2014/0277691 A1 | 9/2014 | Jacobus et al. |
| 2015/0359185 A1 | 12/2015 | Guy |
| 2018/0029797 A1 | 2/2018 | Hance et al. |
| 2019/0064845 A1 | 2/2019 | Pardasani et al. |
| 2019/0122157 A1 | 4/2019 | Jenkins et al. |
| 2019/0161274 A1 | 5/2019 | Paschall et al. |
| 2019/0228597 A1 | 7/2019 | Brown et al. |
| 2019/0243384 A1 | 8/2019 | Chopra et al. |
| 2019/0265704 A1 | 8/2019 | Gariepy et al. |
| 2020/0016754 A1 | 1/2020 | Skubch |
| 2020/0133305 A1 | 4/2020 | Gariepy et al. |
| 2020/0164895 A1 | 5/2020 | Boss et al. |
| 2023/0131736 A1* | 4/2023 | Zlopasa .............. B62D 7/16 180/204 |
| 2025/0019003 A1* | 1/2025 | Vinconneau .......... B62D 5/062 |

FOREIGN PATENT DOCUMENTS

| | | | | |
|---|---|---|---|---|
| CN | 104477238 A | * | 4/2015 | .............. B62D 7/14 |
| CN | 205668589 U | * | 11/2016 | |
| CN | 113619683 A | * | 11/2021 | .............. B60G 3/20 |
| EP | 3656702 A1 | | 5/2020 | |
| JP | H0796853 A | * | 4/1995 | |
| JP | H08127358 A | * | 5/1996 | |
| WO | WO 2018/039337 A1 | | 3/2018 | |
| WO | WO 2019/166517 A1 | | 9/2019 | |
| WO | WO 2019/166518 A1 | | 9/2019 | |

OTHER PUBLICATIONS

PCT Invitation to Pay, PCT Application No. PCT/IB2021/059263, Dec. 9, 2021, 14 pages.

United States Office Action, U.S. Appl. No. 17/138,444, filed Oct. 25, 2022, 14 pages.

\* cited by examiner ial Patent Application No. 63/270,787, entitled "Steering System for
STEERING SYSTEM FOR AUTONOMOUS MOBILE ROBOT

CROSS-REFERENCE TO RELATED APPLICATIONS

This application claims priority to U.S. Provisional Patent Application No. 63/270,787, entitled "Steering System for Autonomous Mobile Robot" and filed Oct. 22, 2021, the contents of which are hereby incorporated by reference herein in its entirety.

Additionally, U.S. patent application Ser. No. 17/138,444 represents some example contexts within which an improved steering system may be used, the contents of which are hereby incorporated by reference herein in its entirety. However, the present disclosure is not limited to those example contexts and may be used for any kind of vehicle using a steering system.

BACKGROUND

An autonomous mobile robot is a vehicle that is capable of autonomously traversing their environments, manipulating objects, and avoiding obstacles. As used herein, "autonomously" means performed without direct human interaction or instruction. Example autonomous mobile robots include automobiles, trucks, warehouse robots, curbside delivery robots, cleaning robots, and hospitality robots. These robots may operate in environments that require the robots to maneuver around tight turns while avoiding obstacles. An autonomous mobile robot may use a four-wheel steering system to achieve an improved steering radius. However, these steering systems may be bulky, and thus may increase the overall size of the autonomous mobile robot. A larger autonomous mobile robot will also have difficulty navigating environments with narrow spacing between obstacles. Therefore, conventional steering mechanisms often fail to provide a narrow turning radius without significantly adding to the size of the autonomous mobile robot.

SUMMARY

An autonomous mobile robot may use an improved steering system. The improved steering system may include a steering motor that is operably coupled to a motor shaft. The motor shaft may be aligned at an offset position relative to a center axis of the autonomous mobile robot. The motor shaft may be operably coupled to a front and rear steering linkage. Each steering linkage may include a pitman arm that is coupled to the motor shaft and a drag link. The drag link may be coupled to a first steering arm and a tie rod. The tie rod may also be coupled to a second steering arm. The first steering arm may be coupled to a first wheel and the second steering arm may be coupled to a second wheel.

When the motor shaft is aligned at an offset position relative to a center axis of the autonomous mobile robot, the improved steering system has a smaller footprint than conventional four-wheel steering systems. Thus, an autonomous mobile robot using the improved steering system may have the narrower turning radius of a four-wheel steering system with a smaller overall size.

DETAILED DESCRIPTION

Figure 1A:
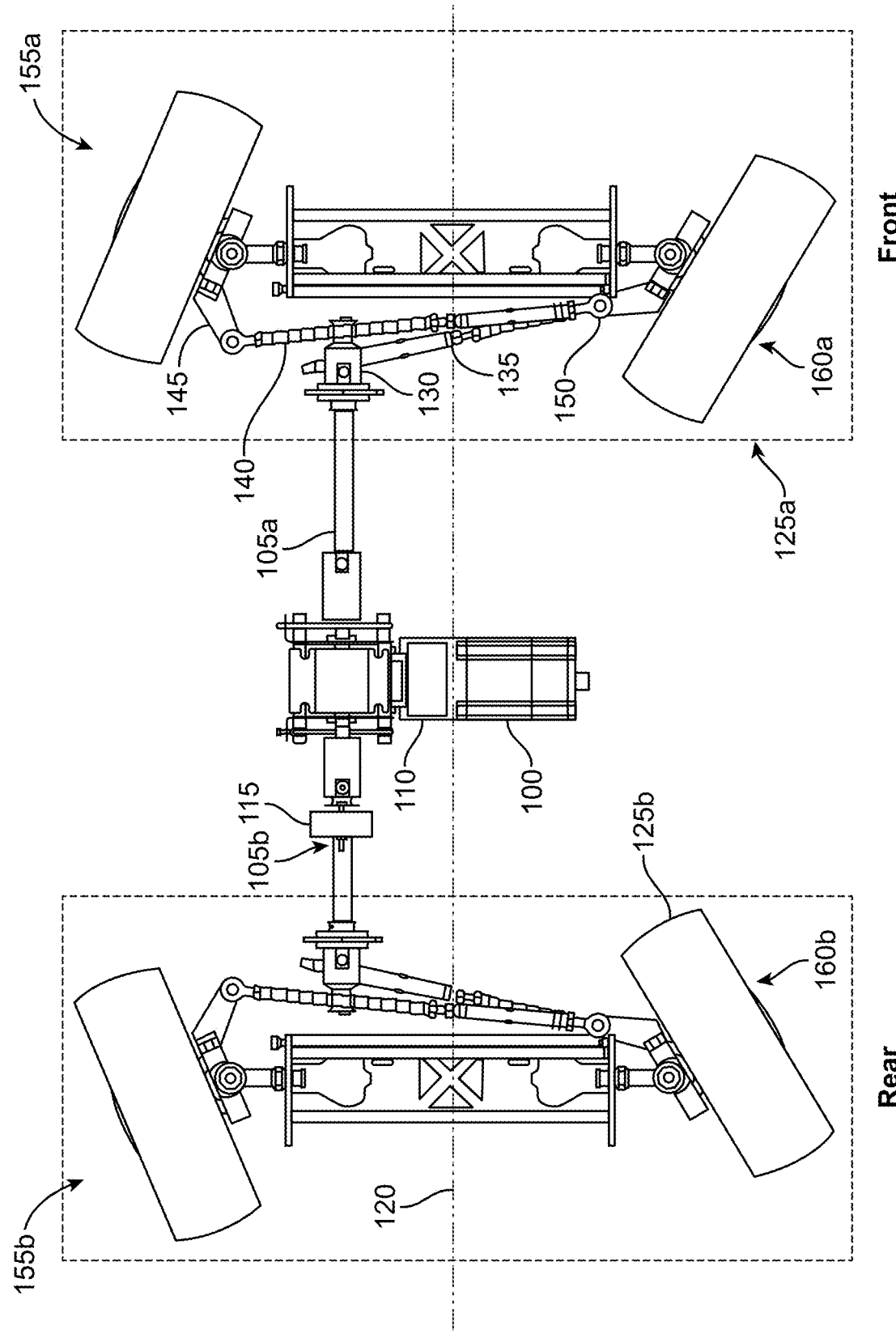
FIG. 1A illustrates an example improved steering system for an autonomous mobile robot, in accordance with some embodiments.

FIG. 1A illustrates an example improved steering system for an autonomous mobile robot, in accordance with some embodiments. Alternative embodiments of the steering system may include more, fewer, or different components from those illustrated in FIG. 1A. The steering system illustrated by FIG. 1A may be coupled to an autonomous mobile robot and may be configured to steer the autonomous mobile robot within an environment. However, the steering system illustrated by FIG. 1A may be used for steering by non-autonomous vehicles as well.

The steering system includes a steering motor 100 that is coupled to a motor shaft 105. The steering motor 100 may also be coupled to a power source of the autonomous mobile robot.

The steering motor 100 may be coupled to the motor shaft 105 via a speed reducer gearbox 110 such that the speed applied by the steering motor 100 to the motor shaft 105 is decreased. The motor shaft 105 may also be coupled to a rotary encoder 115 that tracks the rotation of the motor shaft 105.

In some embodiments, the autonomous mobile robot includes a steering controller that provides steering instructions to the steering system. The steering controller may include one or more processing units capable of processing information. For example, the steering controller may include one or more of a CPU, a GPU, a microprocessor, or integrated circuitry. The steering controller may be coupled to any part of the autonomous mobile robot, whether or not pictured in FIGS. 1-8, and may be coupled to any component of the autonomous mobile robot in a manner that enables the steering controller to issue instructions consistent with operations disclosed herein. The steering controller may be electrically coupled to the steering motor 100 such that the steering controller can control the rotation of the steering motor 100, and thereby control the steering configuration of the steering system. The steering controller may also be coupled to a rotary encoder 115 that is coupled to the motor shaft 105. The steering controller may use rotation information from the rotary encoder 115 to determine what instructions to provide the steering motor 100.

In some embodiments, the steering controller receives navigation instructions for controlling the steering system. The navigation instructions are one or more instructions for controlling the steering system. The navigation instructions may include direct instructions for how the steering controller should instruct the steering system (e.g., instructions for the steering motor 100 of how much to rotate). The navigation instructions also may include general instructions of maneuvers for the autonomous mobile robot to take which the steering controller converts into instructions for the steering system (e.g., instructions to execute a right-turn with a particular turning radius, which the steering controller converts into instructions for the steering motor). The steering controller may receive navigation instructions from a processing unit on the autonomous mobile robot and/or may receive navigation instructions wirelessly from a remote server.

The motor shaft 105 may be aligned at an offset position relative to a center axis 120 of the autonomous mobile robot. The steering motor 100 may be positioned at the center, or substantially at the center, of the motor shaft 105 or may be offset relative to the center of the motor shaft 105. In some embodiments, the motor shaft 105 includes a front motor shaft 105a and a rear motor shaft 105b. The front motor shaft 105a may be coupled to the steering motor 100 and to a front steering linkage 125a. Similarly, the rear motor shaft 105b may be coupled to steering motor 100 and a rear steering linkage 125b.

Figure 1B:
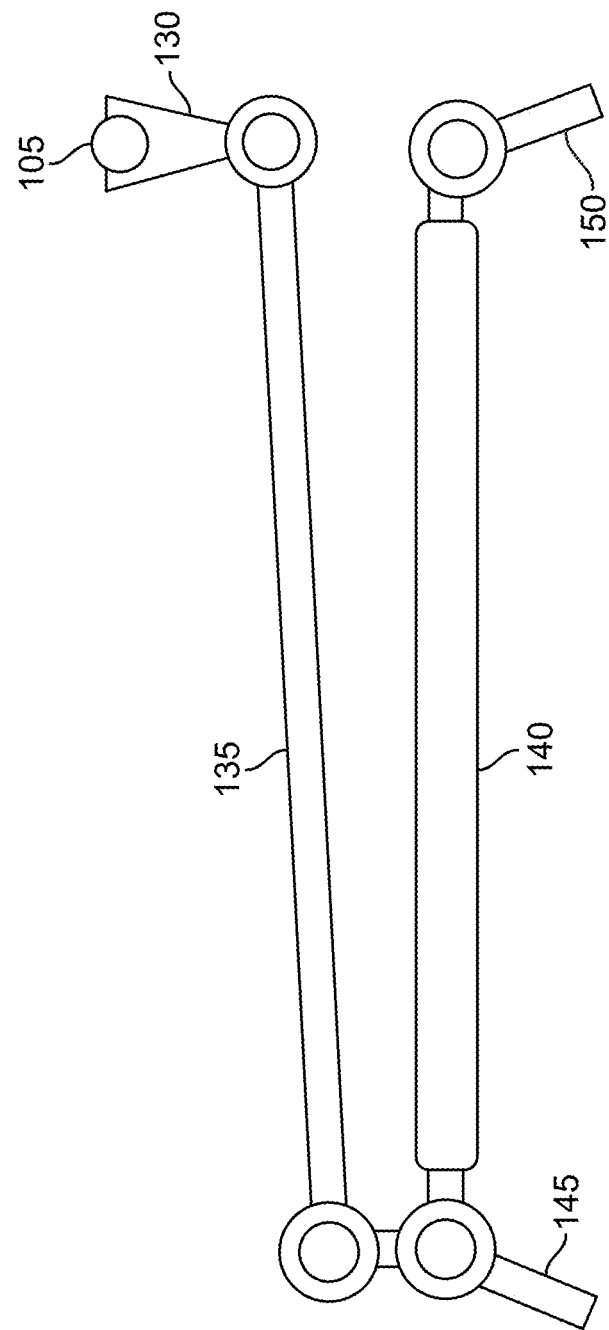
FIG. 1B illustrates an example steering linkage, in accordance with some embodiments.

The steering motor 100 may be coupled to a front steering linkage 125a and a rear steering linkage 125b via the motor shaft. FIG. 1B illustrates an example steering linkage 125, in accordance with some embodiments. In alternative embodiments, the example steering linkage may include more, fewer, and/or different components from those illustrated in FIG. 1B. The example steering linkage 125 may represent an example structure of the front steering linkage 125a or the rear steering linkage 125b. In some embodiments, the front steering linkage 125a and the rear steering linkage 125b are substantially the same in structure. Alternatively, the front steering linkage 125a and the rear steering linkage 125b may have different structures.

The steering linkage 125 may include a pitman arm 130 that is coupled to the motor shaft 105 and a drag link 135. The drag link 135 may be coupled to a first end of a tie rod 140 and a first steering arm 145. The second end of the tie rod 140 may be coupled to a second steering arm 150. The first steering arm 145 may be coupled to a first wheel 155 and the second steering arm 150 may be coupled to a second wheel 160. In some embodiments, the steering linkage 125 is a modified Ackerman steering linkage.

FIGS. 2-8 illustrate the improved steering system from different views, according to some embodiments. Alternative embodiments of the improved steering system may include more, fewer, or different components from those illustrated in FIGS. 2-8.

Figure 2:
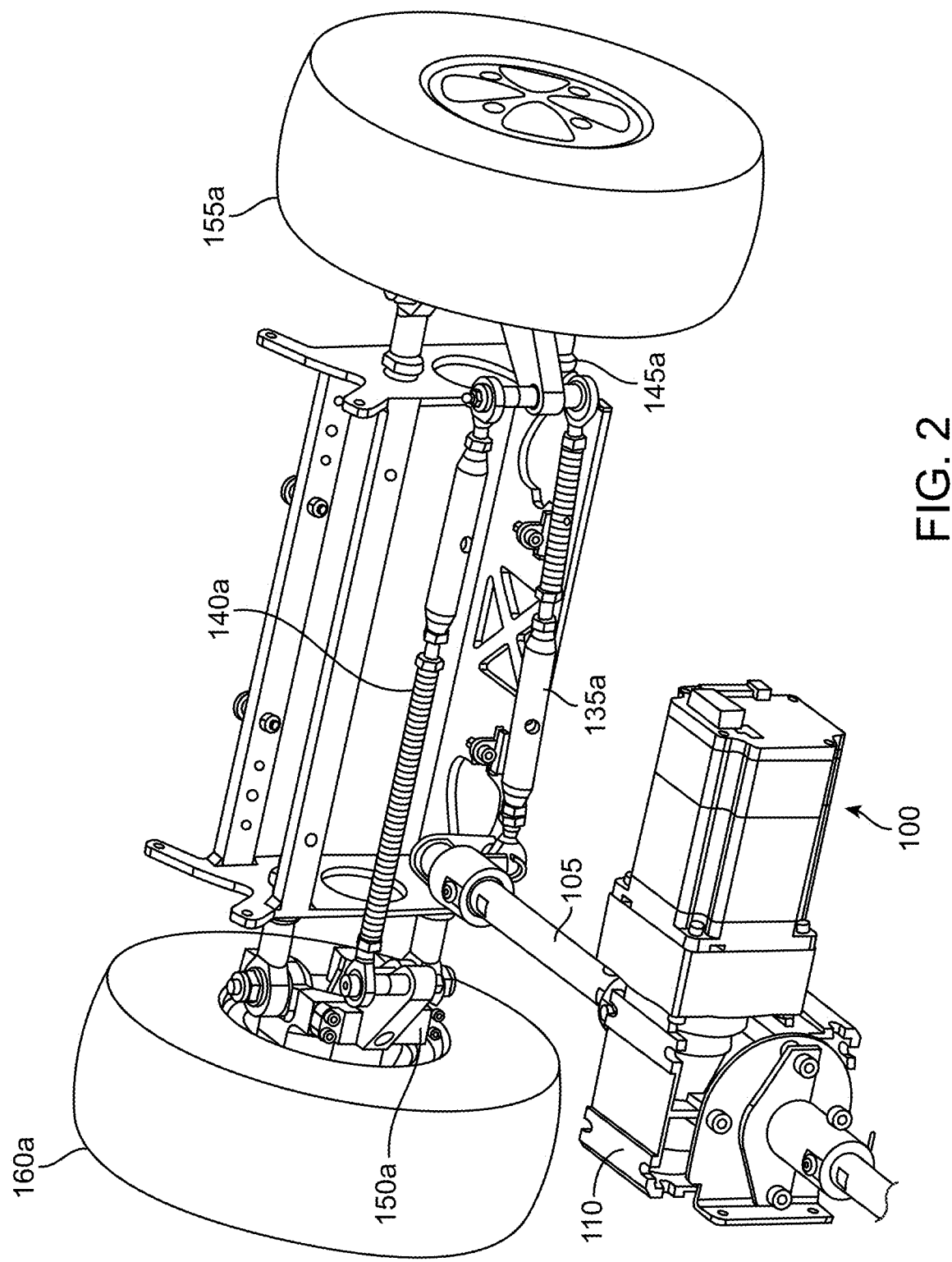
FIG. 2 illustrates an angled view of the improved steering system that focuses on the front steering linkage, in accordance with some embodiments.

FIG. 2 illustrates an angled view of the improved steering system that focuses on the front steering linkage, according to some embodiments. In FIG. 2, the steering system is not engaged in a turning configuration, i.e., the autonomous mobile robot would move in a straight line.

Figure 3:
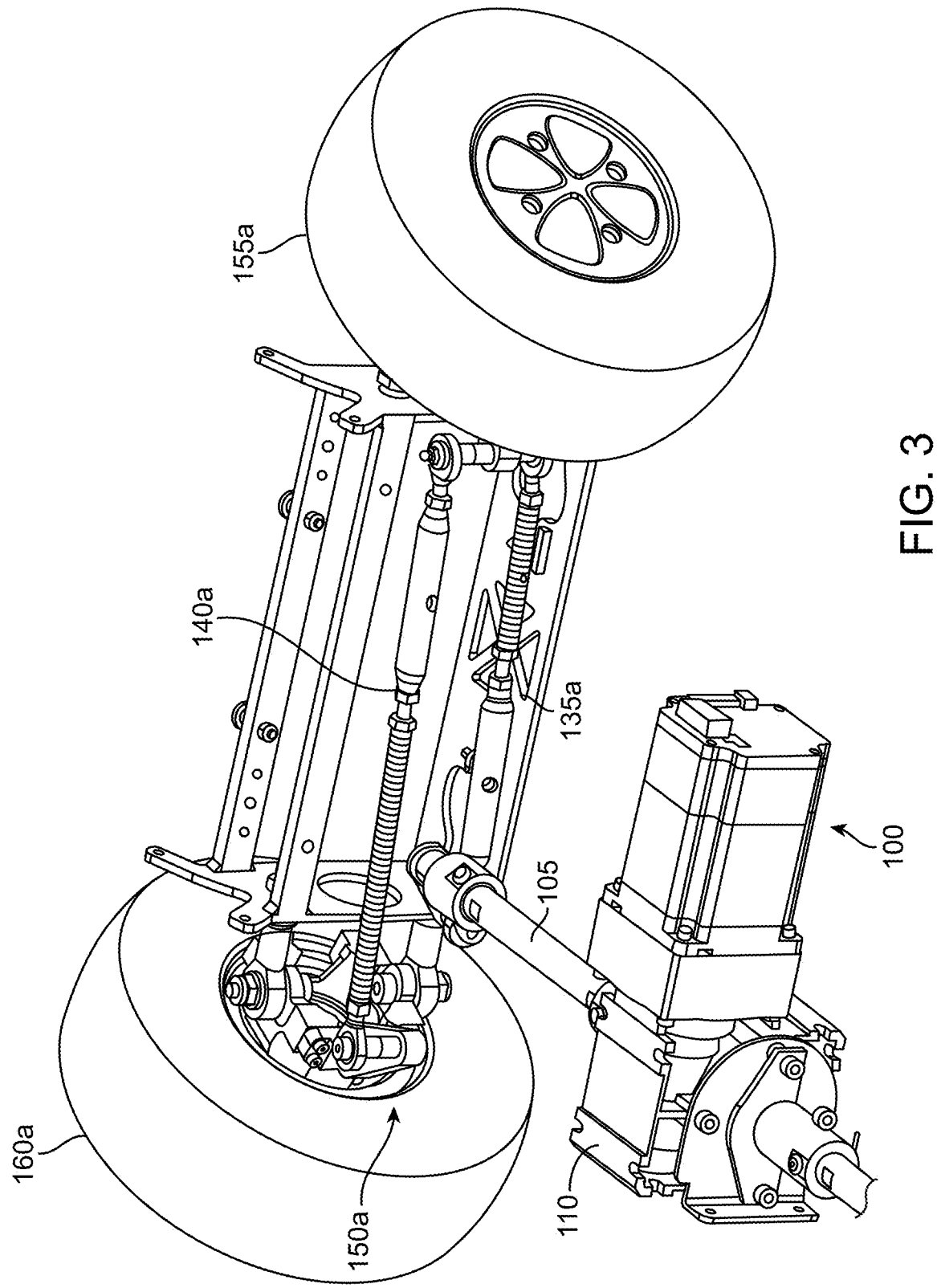
FIG. 3 is a similar view of the improved steering system to FIG. 2 while steering system is engaged in a turning configuration that would cause the robot to turn to the right, in accordance with some embodiments.

FIG. 3 is a similar view of the improved steering system to FIG. 2, according to some embodiments. However, in FIG. 3, the steering system is engaged in a turning configuration that would cause the robot to turn to the right.

Figure 4:
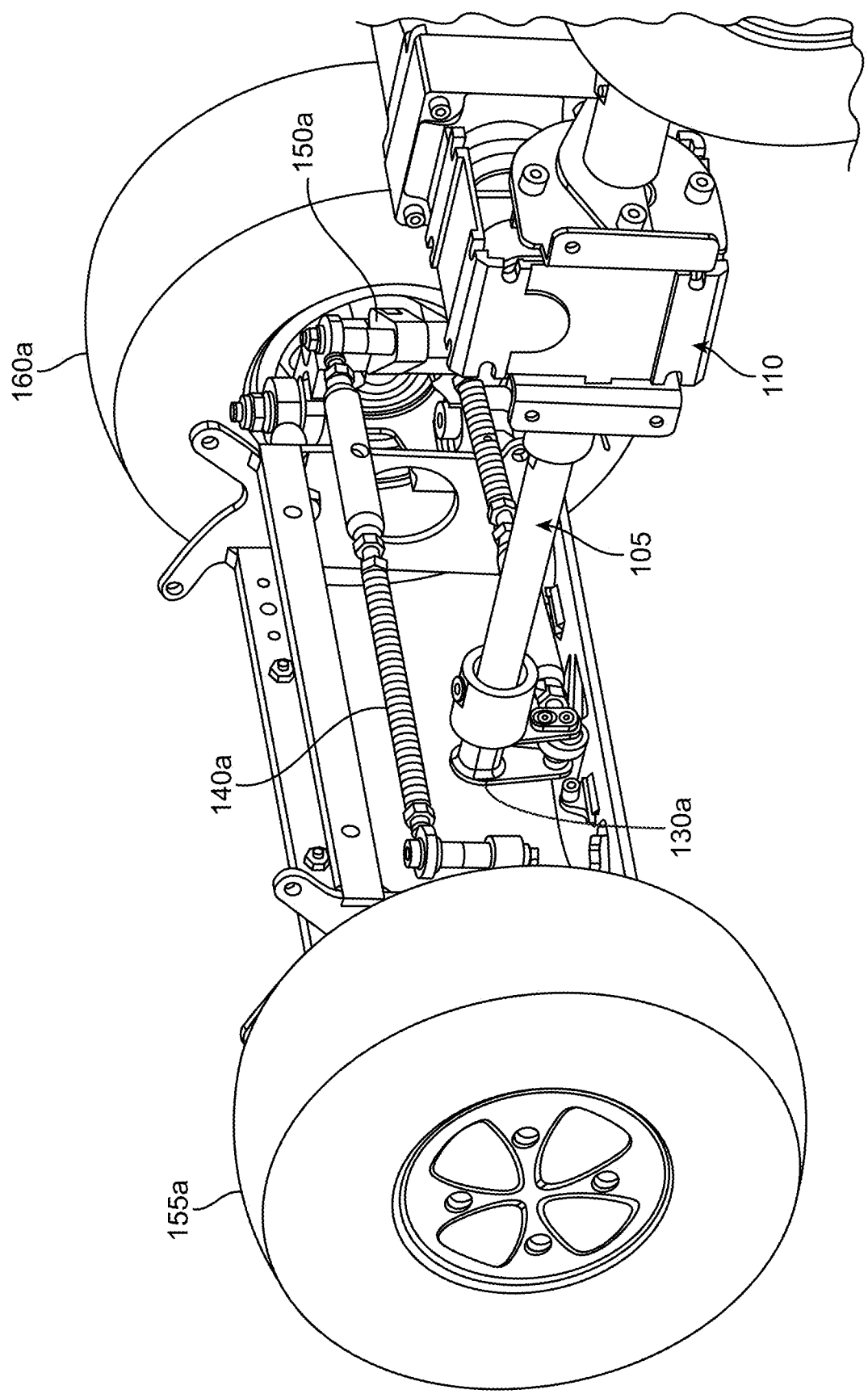
FIG. 4 is an angled view of the improved steering system that focuses on the front steering linkage, in accordance with some embodiments.

FIG. 4 is an angled view of the improved steering system that focuses on the front steering linkage, according to some embodiments. In FIG. 4, the steering system would not cause the autonomous mobile robot to turn, i.e., the autonomous mobile robot would move in a straight line. The improved steering system illustrated in FIG. 4 may be in the same configuration as the steering system illustrated in FIG. 2.

Figure 5:
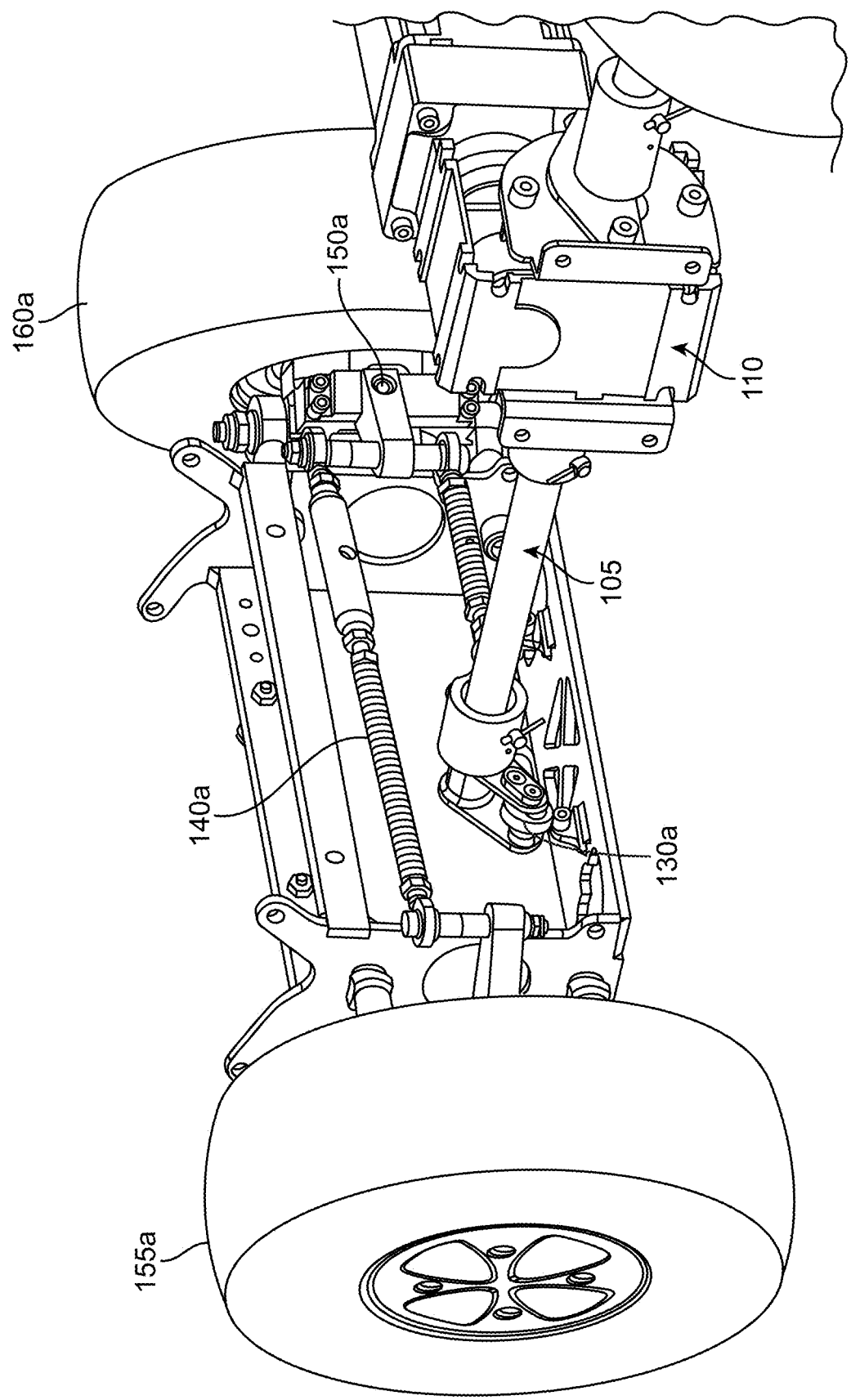
FIG. 5 is a similar view of the improved steering system to FIG. 4 while steering system is engaged in a turning configuration that would cause the robot to turn to the right, according to some embodiments.

FIG. 5 is a similar view of the improved steering system to FIG. 4, according to some embodiments. However, in FIG. 5, the steering system would cause the autonomous mobile robot to turn to the right. The improved steering system illustrated in FIG. 5 may be in the same configuration as the steering system illustrated in FIG. 3.

Figure 6:
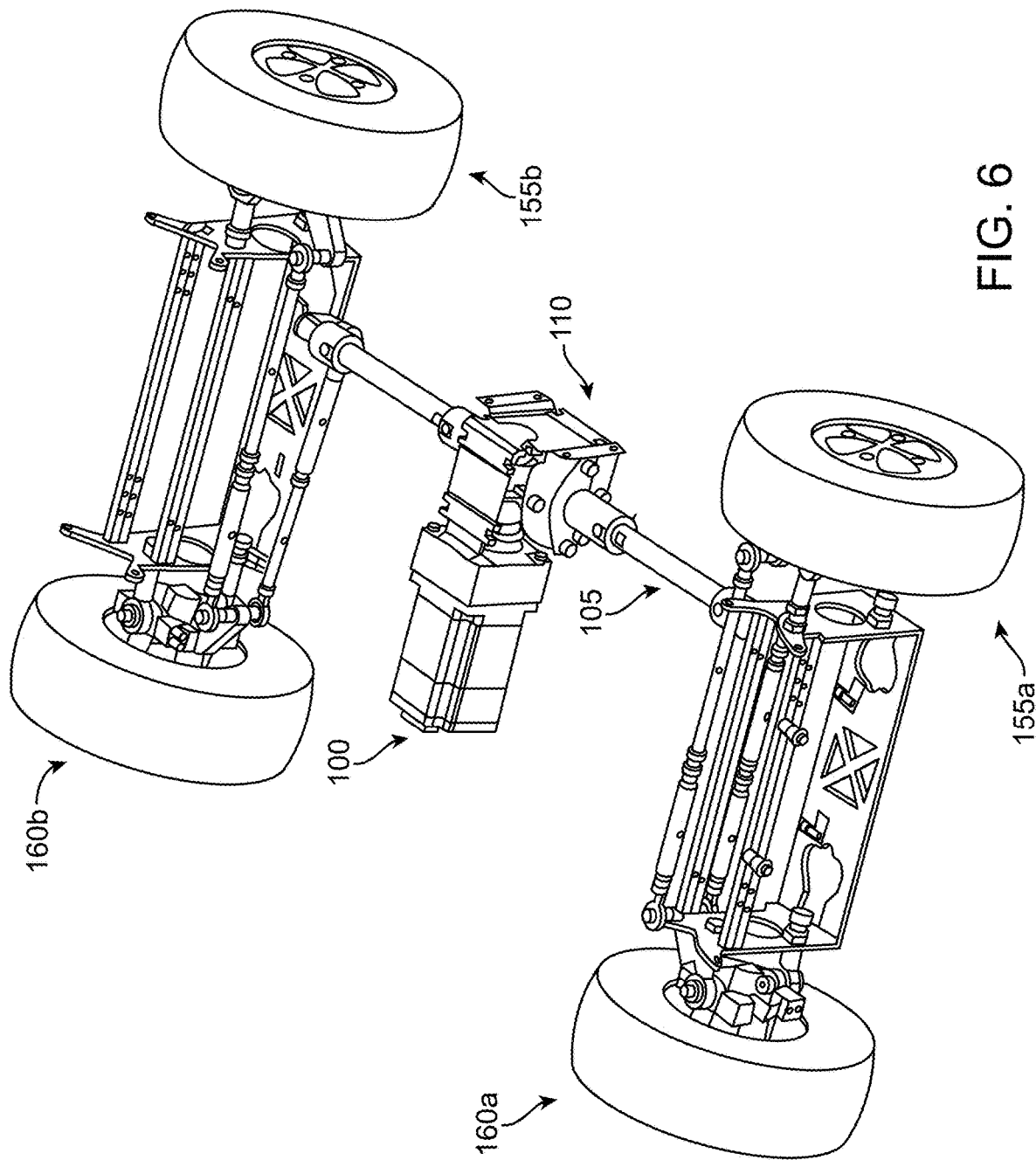
FIG. 6 is an angled view of the improved steering system, according to some embodiments.

FIG. 6 is an angled view of the improved steering system, according to some embodiments. The improved steering system illustrated in FIG. 6 may be in the same configuration as the steering system illustrated in FIGS. 2 and 4.

Figure 7:
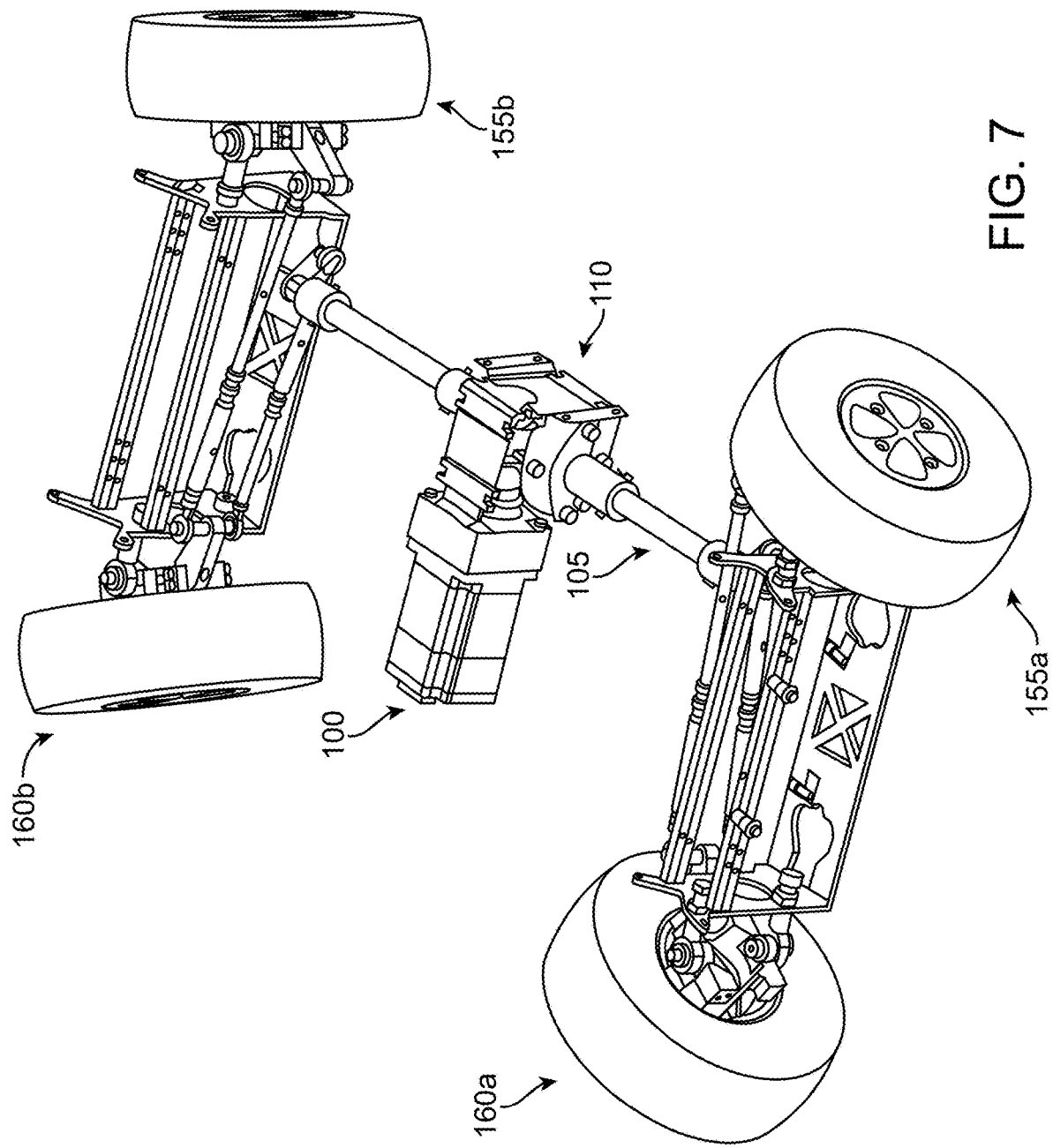
FIG. 7 is a similar view of the improved steering system to FIG. 6 while steering system is engaged in a turning configuration that would cause the robot to turn to the right, in accordance with some embodiments.
Figure 8:
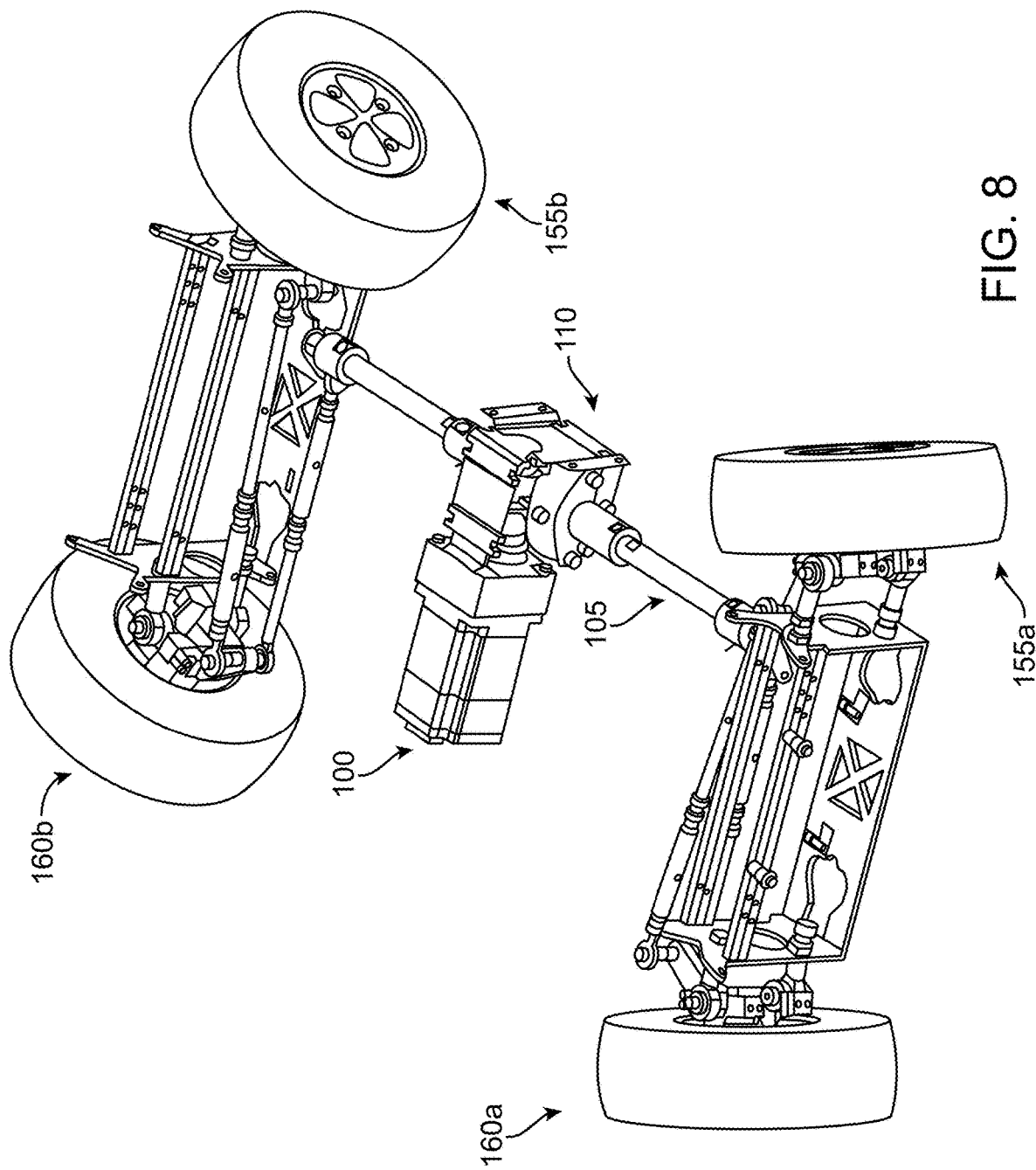
FIG. 8 is a similar view of the improved steering system to FIG. 6 while steering system is engaged in a turning configuration that would cause the robot to turn to the left, in accordance with some embodiments.

FIGS. 7 and 8 are similar views of the improved steering system to FIG. 6, according to some embodiments. In FIG. 7, the steering system is engaged in a turning configuration that would cause the robot to turn to the right, such as the configuration of FIGS. 3 and 5. Similarly, in FIG. 8, the steering system is engaged in a turning configuration that would cause the robot to turn to the left.

Figure 9:
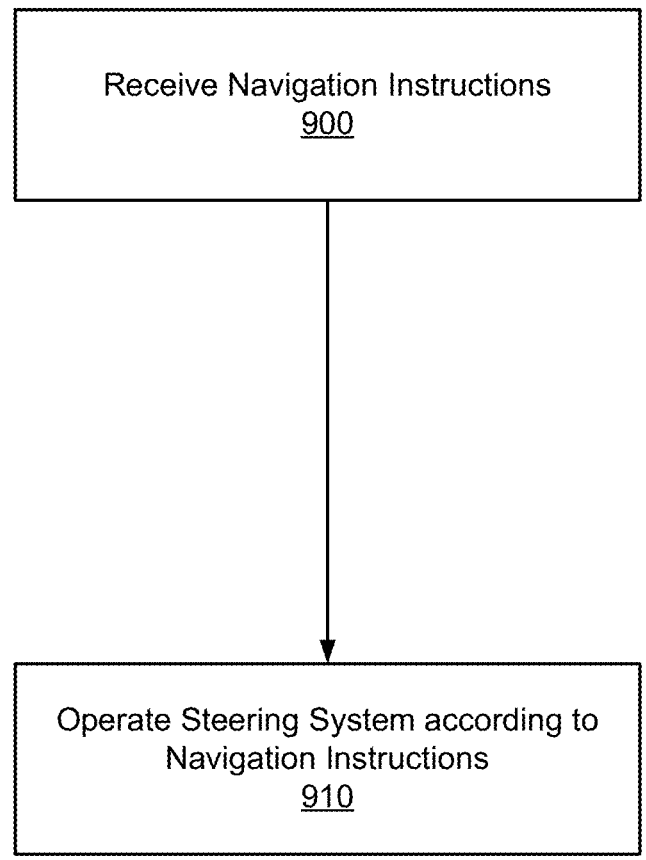
FIG. 9 is a flowchart illustrating an example method for operating an autonomous mobile robot with a steering system, in accordance with some embodiments.

FIG. 9 is a flowchart illustrating an example method for operating an autonomous mobile robot with a steering system, in accordance with some embodiments. The method may have more, fewer, or different steps from those illustrated in FIG. 9, and may be performed in a different order from that illustrated in FIG. 9. Furthermore, the steps may be performed in response to an instruction from a user or may be performed automatically.

A steering controller of an autonomous mobile robot receives 900 navigation instructions. The steering controller may receive the navigation instructions from a control module of the autonomous mobile robot that controls the overall operation or navigation of the autonomous mobile robot. The steering controller also may receive the navigation instructions from a central control system that controls the operation or navigation of multiple autonomous mobile robots within an environment.

The navigation instructions are one or more instructions for controlling the steering system. The navigation instructions may include direct instructions for how the steering controller should instruct the steering system (e.g., instructions for how much to rotate the steering motor and in which direction). The navigation instructions also may include general instructions of maneuvers for the autonomous mobile robot to take which the steering controller converts into instructions for the steering system (e.g., instructions to execute a right-turn with a particular turning radius, which the steering controller converts into instructions for the steering motor).

The steering controller operates 910 the steering system according to the navigation instruction. For example, the steering controller may cause the steering motor to rotate the motor shaft. The steering controller may cause the steering motor to rotate the motor shaft by a certain amount, in a certain direction, and/or for a certain period of time. In some embodiments, the steering controller operates the steering motor based on data received from a rotary encoder coupled to the motor shaft. When the steering motor rotates the motor shaft, steering linkages coupled to the motor shaft may cause both the front wheels and the rear wheels to be adjusted into a configuration that adjusts the steering of the autonomous mobile robot. By adjusting both the front wheels and the rear wheels, the steering system can achieve a tighter turning radius than conventional steering systems.

Additional Considerations

While the terms "front" and "rear" may be used herein to refer to portions of the improved steering system (e.g., the "front steering linkage" and the "rear steering linkage"), these terms are not meant to limit any of the functionality of the autonomous mobile robot. For example, the autonomous mobile robot may travel unidirectionally (e.g., the autonomous mobile robot primarily travels such that the "front" is facing in the direction of travel) or may travel bidirectionally (e.g., the autonomous mobile robot is equally capable of traveling with the front or the rear facing the direction of travel).

Some embodiments may be described using the expression "coupled" or "operably coupled" along with their derivatives. The terms "coupled" or "operably coupled" are used herein interchangeably to mean that two or more elements are in direct or indirect contact with each other, and thereby co-operate or interact with each other.

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A steering system for an autonomous mobile robot comprising:
   a steering motor operably coupled to a speed reducer gearbox;
   a motor shaft that is operably coupled to the steering motor, wherein the motor shaft is aligned at an offset position relative to a center axis of an autonomous mobile robot;
   a forward steering linkage that is operably coupled to a first end of the motor shaft, wherein the forward steering linkage comprises a first wheel operably coupled to the motor shaft and a second wheel operably coupled to the motor shaft, wherein the second wheel is operably coupled to the motor shaft with a first link that is longer than a second link that operably couples the motor shaft with the first wheel; and
   a rear steering linkage that is operably coupled to a second end of the motor shaft, wherein the rear steering linkage comprises a third wheel operably coupled to the motor shaft and a fourth wheel operably coupled to the motor shaft; wherein the fourth wheel is operably coupled to the motor shaft with a third link that is longer than a fourth link that operably couples the motor shaft with the first wheel.

2. The steering system of claim 1, wherein the steering motor is substantially centered on the motor shaft.

3. The steering system of claim 1, wherein the motor shaft is operably coupled to a first end of the speed reducer gearbox and the steering motor is operably coupled to a second end of the speed reducer gearbox.

4. The steering system of claim 1, wherein:
   the forward steering linkage comprises a first steering arm that is operably coupled to the first wheel at a first end of the first steering arm and that is operably coupled to the motor shaft at a second end of the first steering arm;
   the forward steering linkage comprises a second steering arm that is operably coupled to the second wheel at a first end of the second steering arm and that is operably coupled to the motor shaft at a second end of the second steering arm;
   the rear steering linkage comprises a third steering arm that is operably coupled to the third wheel at a first end of the third steering arm and that is operably coupled to the motor shaft at a second end of the third steering arm; and
   the rear steering linkage comprises a fourth steering arm that is operably coupled to the fourth wheel at a first end of the fourth steering arm and that is operably coupled to the motor shaft at a second end of the fourth steering arm.

5. The steering system of claim 4, wherein:
   the front steering linkage comprises a front tie rod that is operably coupled to the second end of the second steering arm at a first end of the front tie rod and that is operably coupled to the motor shaft at a second end of the front tie rod; and
   the rear steering linkage comprises a rear tie rod that is operably coupled to the second end of the fourth steering arm at a first end of the rear tie rod and that is operably coupled to the motor shaft at a second end of the rear tie rod.

6. The steering system of claim 4, wherein:
   the front steering linkage comprises a front pitman arm that is operably coupled to the motor shaft at a first end of the front pitman arm and that is operably coupled to the first steering arm and the second steering arm at a second end of the front pitman arm; and
   the rear steering linkage comprises a rear pitman arm that is operably coupled to the motor shaft at a first end of the rear pitman arm and that is operably coupled to the third steering arm and the fourth steering arm at a second end of the rear pitman arm.

7. The steering system of claim 6, wherein:
   the front steering linkage comprises a front drag link, wherein the front drag link is operably coupled to the second end of the front pitman arm at a first end of the front drag link and is operably coupled to the first steering arm and the second steering arm at a second end of the front drag link; and
   the rear steering linkage comprises a rear drag link, wherein the rear drag link is operably coupled to the second end of the rear pitman arm at a first end of the rear drag link and is operably coupled to the third steering arm and the fourth steering arm at a second end of the rear drag link.

8. The steering system of claim 1, wherein the motor shaft is operably coupled to a rotary encoder.

9. The steering system of claim 1, wherein the motor shaft comprises:
   a front motor shaft that is operably coupled to the speed reducer gearbox at a first end of the front motor shaft and that is operably coupled to the forward steering linkage at a second end of the front motor shaft; and a rear motor shaft that is operably coupled to the speed reducer gearbox at a first end of the rear motor shaft and that is operably coupled to the rear steering linkage at a second end of the rear motor shaft.

10. An autonomous mobile robot comprising:
a steering system, wherein the steering system comprises:
   a steering motor;
   a motor shaft that is operably coupled to the steering motor, wherein the motor shaft is aligned at an offset position relative to a center axis of the autonomous mobile robot;
   a forward steering linkage that is operably coupled to a first end of the motor shaft, wherein the forward steering linkage comprises a first wheel operably coupled to the motor shaft and a second wheel operably coupled to the motor shaft, wherein the second wheel is operably coupled to the motor shaft with a first link that is longer than a second link that operably couples the motor shaft with the first wheel; and
   a rear steering linkage that is operably coupled to a second end of the motor shaft, wherein the rear steering linkage comprises a third wheel operably coupled to the motor shaft and a fourth wheel operably coupled to the motor shaft, wherein the fourth wheel is operably coupled to the motor shaft with a third link that is longer than a fourth link that operably couples the motor shaft with the first wheel; and
a steering controller that is operably coupled to the steering motor of the steering system, wherein the steering controller is configured to receive navigation instructions and execute the navigation instructions using instructions to the steering motor.

11. The autonomous mobile robot of claim 10, wherein the steering motor is operably coupled to a speed reducer gearbox.

12. The autonomous mobile robot of claim 11, wherein the motor shaft comprises:
   a front motor shaft that is operably coupled to the speed reducer gearbox at a first end of the front motor shaft and that is operably coupled to the forward steering linkage at a second end of the front motor shaft; and
   a rear motor shaft that is operably coupled to the speed reducer gearbox at a first end of the rear motor shaft and that is operably coupled to the rear steering linkage at a second end of the rear motor shaft.

13. The autonomous mobile robot of claim 10, wherein:
the forward steering linkage comprises a first steering arm that is operably coupled to the first wheel at a first end of the first steering arm and that is operably coupled to the motor shaft at a second end of the first steering arm;
the forward steering linkage comprises a second steering arm that is operably coupled to the second wheel at a first end of the second steering arm and that is operably coupled to the motor shaft at a second end of the second steering arm;
the rear steering linkage comprises a third steering arm that is operably coupled to the third wheel at a first end of the third steering arm and that is operably coupled to the motor shaft at a second end of the third steering arm; and
the rear steering linkage comprises a fourth steering arm that is operably coupled to the fourth wheel at a first end of the fourth steering arm and that is operably coupled to the motor shaft at a second end of the fourth steering arm.

14. The autonomous mobile robot of claim 13, wherein:
the front steering linkage comprises a front tie rod that is operably coupled to the second end of the second steering arm at a first end of the front tie rod and that is operably coupled to the motor shaft at a second end of the front tie rod; and
the rear steering linkage comprises a rear tie rod that is operably coupled to the second end of the fourth steering arm at a first end of the rear tie rod and that is operably coupled to the motor shaft at a second end of the rear tie rod.

15. The autonomous mobile robot of claim 13, wherein:
the front steering linkage comprises a front pitman arm that is operably coupled to the motor shaft at a first end of the front pitman arm and that is operably coupled to the first steering arm and the second steering arm at a second end of the front pitman arm; and
the rear steering linkage comprises a rear pitman arm that is operably coupled to the motor shaft at a first end of the rear pitman arm and that is operably coupled to the third steering arm and the fourth steering arm at a second end of the rear pitman arm.

\* \* \* \* \*